United States Patent
Demarest

[15] 3,684,943
[45] Aug. 15, 1972

[54] CONVERTER VALVE-PAIR ARRANGEMENT

[72] Inventor: Donald M. Demarest, Wallingford, Pa.

[73] Assignee: General Electric Company

[22] Filed: Feb. 1, 1971

[21] Appl. No.: 111,314

[52] U.S. Cl. ................321/8 C, 317/100, 321/27 R
[51] Int. Cl. .............................................H02m 7/00
[58] Field of Search..321/8 R, 8 C, 27 R; 317/234 A, 317/234 H, 100

[56] References Cited

UNITED STATES PATENTS

| | | | |
|---|---|---|---|
| 3,609,510 | 9/1971 | Berkovsky et al. | 321/8 R |
| 3,629,687 | 12/1971 | Hessen | 321/8 R |
| 3,445,747 | 5/1969 | Laurent | 321/8 C |
| 3,344,315 | 9/1967 | Schneider | 317/100 |

FOREIGN PATENTS OR APPLICATIONS

265,367   5/1963   Australia....................321/8 C

*Primary Examiner*—William H. Beha, Jr.
*Attorney*—J. Wesley Haubner et al.

[57] ABSTRACT

Insulative housings are provided for enclosing a plurality of semiconductor rectifiers which form valve-pairs of a plural-bridge-circuit converter. In each of said housings a valve pair of the bridge circuit which is at a higher electrical potential relative to ground is disposed above a valve pair of a bridge circuit which is at a lower electrical potential relative to ground. The housings are spaced sufficiently from one another to provide sufficient insulation between the A-C phases. Further, the space occupied by the lower potential valve pair in a housing serves to insulate the higher potential valve pair therein from ground.

5 Claims, 7 Drawing Figures

INVENTOR:
DONALD M. DEMAREST,
BY Barry G. Stein
ATTORNEY

INVENTOR:
DONALD M. DEMAREST,
BY Barry A. Stein
ATTORNEY

INVENTOR:
DONALD M. DEMAREST,
BY Barry A. Stein
ATTORNEY

CONVERTER VALVE-PAIR ARRANGEMENT

BACKGROUND AND OBJECTS OF THE INVENTION

This invention relates generally to high-voltage solid state electric valves, and more particularly it relates to a housing for a plurality of such valves which wherein preselected valves are electrically interconnected in a plural-bridge circuit, high voltage, electric power converter.

In the high-voltage electric power conversion art, rectification (i.e., the conversion of A-C into D-C) or inversion (i.e., the conversion of D-C into A-C) is ordinarily accomplished by controllable switching elements or valves. Typically six such valves are interconnected in a three-phase double-way bridge configuration having three A-C terminals, each of which is associated with a separate pair of complementary valves, and a set of positive and negative D-C terminals. The two valves forming each complementary pair, popularly referred to as a valve-pair, are arranged to conduct alternately. By sequentially firing the six valves in proper order and in synchronism with the voltages of the three-phase electric power system to which the A-C terminals of the bridge circuit are connected, the flow of power between the A-C and the D-C terminals can be controlled as desired.

The time in which a valve is fired, measured in electrical degrees from the cyclically recurring instant at which its anode voltage first becomes positive with respect to the cathode, is known as "the firing angle." As the firing angles increase from zero (no phase retard), the average magnitude of the rectified voltage between the positive and negative D-C terminals decreases from its maximum positive level. As the firing angle approaches 90°, the average D-C voltage reverses polarity and the bridge commences to operate in its inverting mode, whereby power can be transmitted from the D-C to the A-C terminals.

In High Voltage Direct Current (HVDC) systems, converters may consist of two three-phase, double-way bridges connected in series between positive and negative D-C terminals. When arranged in this manner corresponding valves of the two bridges are fired 30° apart thereby effectuating what is known in the art as "12-pulse" operation. 12-pulse converter operation eliminates certain system generated harmonics which would naturally arise and flow into the A-C system as a result of the switching action of the valves. Therefore, when a converter is connected for a "12-pulse" operation the task of filtering the A-C is made significantly easier.

Converter valves comprising high voltage, heavy current, grid controlled mercury arc tubes are well known in the art. More recently solid state valves comprising switching devices of the multi-layer semiconductor type, e.g., semiconductor controlled rectifiers, have been designed. Such solid state valves commonly utilize a plurality of individual semiconductor rectifiers connected in parallel arrays for high current handling capacity, and a plurality of arrays are connected in series for high voltage blocking ability.

It is customary to physically mount one or more of the arrays in suitable heat dissipating pressure assemblies (e.g., see copending application 48AV00273 assigned to the same assignee as my invention) and to support a plurality of electrically interconnected assemblies in a common enclosure or housing. The walls fo the housing, in particular the base portions serve as the main support insulation for the valve(s) and are typically made of insulation material. Further, the housing provides the means through which a cooling fluid may be brought to enable the rectifiers therein contained to operate within prescribed, safe temperature ranges. A compact housing having a particularly advantageous construction for cooling purposes is disclosed and claimed in copending application 48AV00306, to the same assignee as my invention. As shown in the latter application the housing is typically disposed inside a building, referred to as a valve hall, in which associated cooling equipment (e.g., fans, heat exchangers) is located so that the inside of the building, the cooling equipment and the housing form a forced air-closed loop cooling system.

Irrespective of the type of housing which is used to hold the rectifier-mounting assemblies, it should be constructed and arranged to provide sufficient insulation between the various conductors disposed therein at different electrical potentials. In very high voltage apparatus comprising a plurality of bridge circuits, there are a number of possible arrangements which may be utilized for housing solid state valves. For example a separate housing may be provided for all of the semiconductor rectifiers comprising (1) a single valve; (2) a valve pair, (3) a bridge circuit or (4) the plural bridges making up the entire converter.

Each of the above housing arrangements have several drawbacks when used in very high-voltage, plural-bridge converters. This can be appreciated by considering the use of such arrangements in a "12-pulse" converter comprising a pair of serially connected three-phase double way bridges.

Insofar as the first mentioned arrangement (hereinafter referred to as the "single-valve-housing") is concerned, the converter requires the use of 12 separate housings (i.e., one for each valve). Further, the housings enclosing valves whose potentials are above or below ground potential have to be disposed upon insulative bases to properly insulate them from ground. In view of these factors, the single-valve-housing arrangement may necessitate the provision of a relatively large space in the valve hall.

Insofar as the second arrangement (hereinafter referred to as the "valve-pair-housing") is concerned, although only six of such housings would be required (i.e., one for each valve pair), still the housings enclosing valve pairs which are at potentials above or below ground potential have to be disposed upon insulative bases to insulate them from ground. Therefore, the valve-pair-housing arrangement, like the single-valve arrangement, may occupy an undesirably large space in the valve hall.

Insofar as the third arrangement (hereinafter referred to as the "bridge-housing") is concerned, although only two such housings would be required (i.e., one for each bridge circuit), nevertheless each would be relatively large in order to provide the necessary insulation between the A-C phase conductors contained therein. Large housings are relatively expensive to construct, and access to the semiconductor devices mounted therein may be more difficult than with compact housings. Further, the housing enclosing the valves of the bridge which is at the highest potential (plus or minus) relative to ground potential requires a relatively large insulative base in order to properly insulate them from ground.

Insofar as the fourth arrangement (hereinafter referred to as the "plural-bridge-housing") is concerned, only one housing is required since all of the converter valves are disposed therein. However such a housing is necessarily large and expensive to construct. Further, individual assembly accessibility is rendered that much more difficult owing to the large housing size.

It is therefore a general object of my invention to provide a housing arrangement for selected solid-state valves of electric power conversion apparatus which overcomes the disadvantages of the prior art.

It is a further object of my invention to provide relatively compact housings for preselected electric valves of a high voltage converter to minimize the amount of space required for the apparatus while providing necessary insulation for the various conductors and live circuit elements disposed therein.

SUMMARY OF THE INVENTION

In accordance with one form of my invention separate insulative housings are provided for enclosing a plurality of rectifier-holding assemblies which form valve-pairs of a plural-bridge-circuit converter apparatus. One valve-pair of each of the converters' plural bridge circuits is disposed within a single housing. They are arranged such that the valve pair of the bridge circuit which is at a higher electrical potential relative to ground is disposed above a valve-pair of a bridge circuit which is at a lower electrical potential relative to ground. With this arrangement, the space between separate housings is advantageously used for the necessary insulation between the A-C phases (.e., line-to-line insulation), while the space occupied in each housing by the lower potential valve-pair is utilized to insulate the higher potential valve-pair from ground. Accordingly, the total space within a valve hall which is provided for disposition of a high voltage converter of a given rating utilizing my housing arrangement is less than with prior art housing arrangements.

BRIEF DESCRIPTION OF THE DRAWINGS

My invention will be better understood and its various objects and advantages will be more fully appreciated from the following description taken in conjunction with the accompanying drawings in which.

DETAILED DESCRIPTION OF THE PREFERRED EMBODIMENT

Some of the features shown and described herein form the subject matters of copending patent applications (48AV00273 and 48AV00306 ) assigned to the same assignee as my invention.

Figure 1:
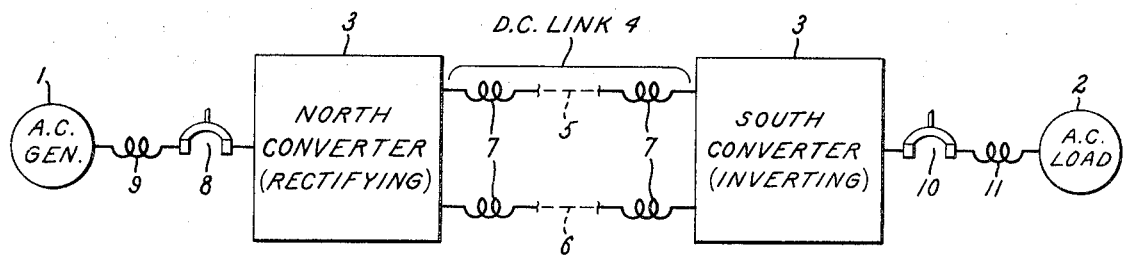
FIG. 1 is a schematic one line diagram of a typical HVDC system in which my invention can be advantageously used.

FIG. 1 of the present application is a one-line representation of a source 1 ("A-C Gen.") supplying electricity to a load 2 ("A-C Load") via a D-C system comprising a pair of high voltage converter plants 3 interconnected by a D-C link 4. The link comprises a nominally positive D-C conductor 5 paralleled by a relatively negative D-C conductor 6, each conductor may have smoothing chokes or reactors 7 in series therewith. The converter at the source terminal of the transmission line is called "North Converter (rectifying)." Its A-C side is coupled to the source 1 by means of a circuit breaker 8, and the A-C system impedance is symbolically shown at 9. The converter at the opposite terminal of the transmission line is called "South Converter (inverting)," and its A-C side is coupled to the load 2 by way of another circuit breaker 10 and A-C cystem impedance 11.

In practice the electric power system shown in FIG. 1 could be bidirectional. For example, an additional source of power could be coupled to the A-C network fed by the South converter for supplying, on demand, other loads coupled to the A-C side of the North converter. The direction of power in the D-C transmission line is readily reversed by changing the operating modes of the converters at the respective terminals so that the South one acts as a rectifier and the North one acts as an inverter.

Figure 2:
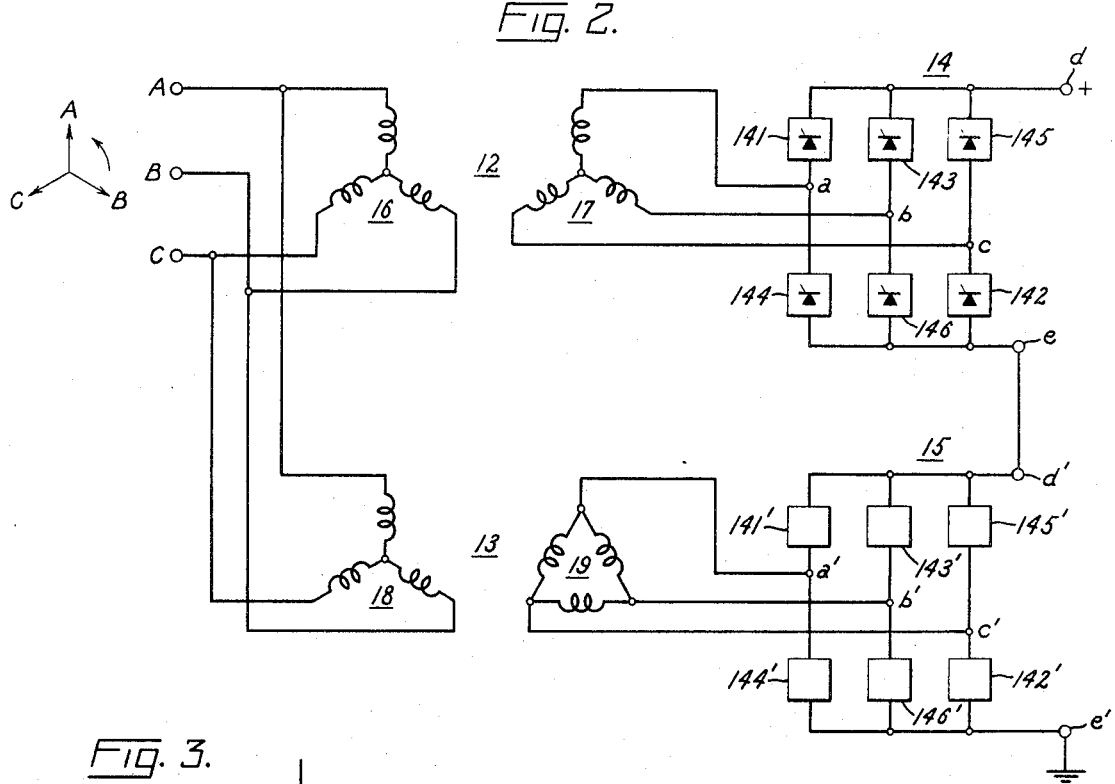
FIG. 2 is a schematic circuit of one pole of the North converter shown in FIG. 1.

FIG. 2 is a schematic circuit diagram of one pole of the North converter 3 of the FIG. 1 system. It will be observed that this pole comprises first and second power transformers 12 and 13 in combination with first and second A-C/D-C bridges 14 and 15, respectively. The first transformer 12 has two inductively coupled sets 16 and 17, of three star-connected windings. The windings of one set 16 are connected respectively to three separate terminals A, B, and C which are adapted to be connected to the respective phases of a three-phase A-C electric power system whose phase rotation is A, B, C. The windings of the companion set 17 are respectively connected to A-C terminals $a$, $b$, and $c$ of the first bridge 14. The bridge 14 has a pair of D-C terminals $d$ and $e$, with the former being connected to the positive D-C terminal of the illustrated converter.

The second transformer 13 of the shown pole of the North converter comprises a set 18 of three wye connected windings inductively coupled to a set 19 of three delta connected windings. The windings of the set 18 are respectively connected to the three terminals A, B, and C, while the windings of the companion set 19 are respectively connected to the A-C terminals $a'$, $b'$ and $c'$ of the second bridge 15. With this arrangement, the A-C voltages at the latter terminals will lag those at the corresponding terminals $a$, $b$, and $c$ of the first bridge 14 by a phase angle of 30 electrical degrees. It should be noted that a single transformer three phase or one phase having two secondaries (one delta connected and one wye connected) may be utilized in lieu of the transformers 12 and 13 shown. The bridge 15 has a pair of D-C terminals $d'$ and $e'$, the former being connected to terminal $e$ of bridge 14, the latter being connected to ground. Thus the two bridges 14 and 15 are connected in series with one another between the positive and ground terminals of the illustrated converter pole, and the D-C voltage across these terminals is the sum of the outputs of the respective bridges.

Bridge 14 comprises six identical controlled valves 141, 142, 143, 144, 145 and 146 arranged in a three-phase double-way bridge configuration. Thus, the cathodes of the odd-numbered valves are connected in common to the upper D-C terminal $d$ of the bridge, and the anodes of the even-numbered valves are connected in common to the other D-C terminal $e$. The anode of the valve 141 and the cathode of valve 144 are both connected to the first terminal $a$ of the three-phase A-C terminals of the bridge. Valves 141 and 144 thus form the valve-pair associated with phase A. The anode of valve 143 and the cathode of valve 146 are both connected to the second A-C terminal $b$. Valves 143 and 146 thus form the valve-pair associated with phase B. The anode of valve 145 and the cathode of valve 142 are both connected to the third A-C terminal $c$. Valves 145 and 142 thus form the valve-pair associated with phase C. By firing these six valves in their numbered sequence at intervals of 60 electrical degrees, three-phase electric power supplied to the A-C terminals of the bridge can be converted to D-C power.

Bridge 15 is composed of valves 141', 142', 143', 144', 145', and 146' whose arrangement and operation are similar to the valves of bridge 14. The gate pulses for sequentially firing the valves of bridge 15 will be interleaved with the gate pulses for the correspondingly numbered valves in the leading bridge 14, thereby forming a 12-pulse converter.

The average magnitude of the rectified voltage between the D-C terminals $d$ and $e'$ is maximum when the firing angle of these gate pulses is zero. By increasing the firing angle to nearly 90°, the D-C voltage can be reduced to zero. Still greater firing angles are used when the bridge is operating in its inverting mode. When operating in this mode the D-C electric power supplied to terminals $d$ and $e'$ is converted by the bridge to three-phase A-C power.

Figure 3:
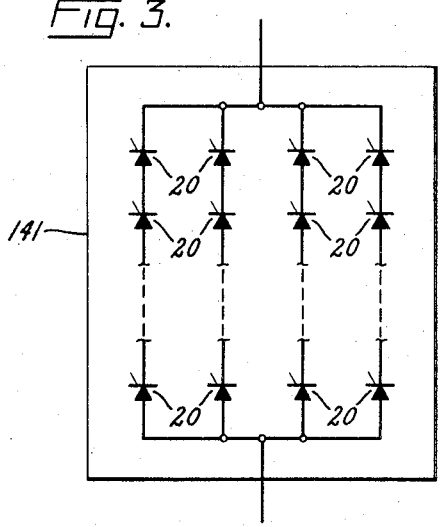
FIG. 3 is a simplified schematic diagram of a typical valve in the converter shown in FIG. 2.

The D-C voltage rating of either bridge depends on the individual voltage rating of each valve. FIG. 3 is a simplified diagram of valve 141. This valve, like all the others, comprises a plurality of semiconductor rectifier devices 20. The rectifiers 20 are connected in parallel arrays for high current handling capacity, and a plurality of these arrays are connected in series to raise the blocking voltage rating of the valve. Although rectifiers 20 are shown schematically as thyristors (i.e., controlled rectifiers) it should be apparent that other rectifier types (e.g., diodes) may be used, depending upon the function to be performed. In a HVDC system each converter valve 141, 142, 143, 144, 141', 142', 143', 144' may include, as shown in FIG. 5, a series string of 16 arrays of four parallel thyristors each.

Figure 4:
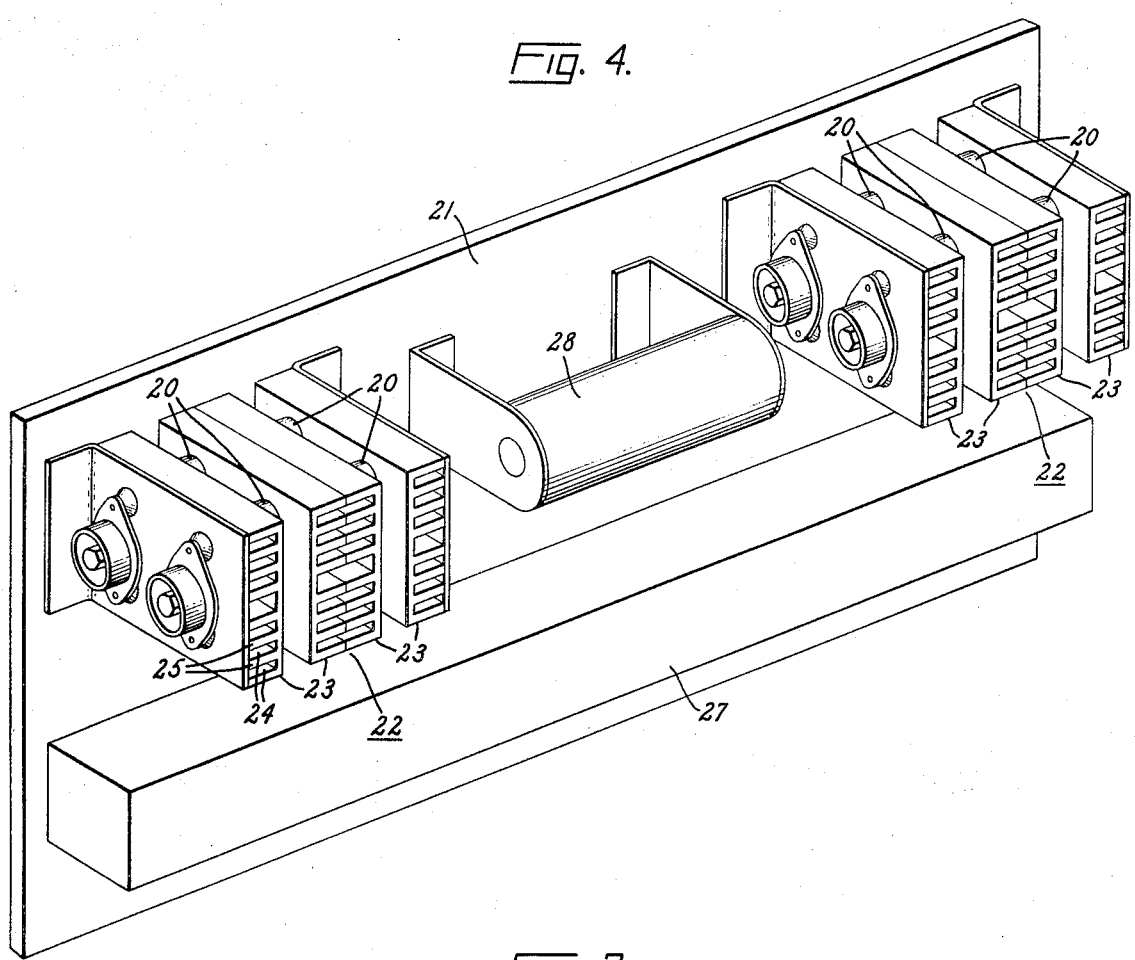
FIG. 4 is a perspective view of a panel for mounting a plurality of rectifier-holding, heat-dissipating assemblies in a unitary housing.
Figure 7:
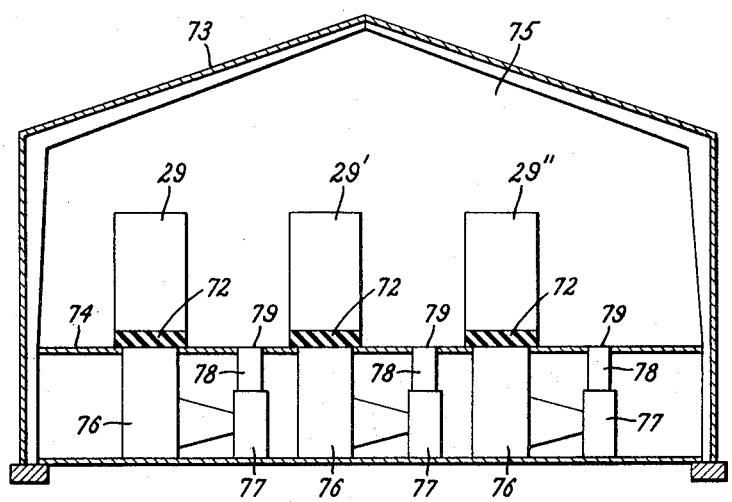
FIG. 7 is a front view in section of a valve hall in which my housings and associated cooling equipment is disposed.

In FIG. 4 of copending application 48AV00273 there is shown a heat-dissipating, rectifier-holding assembly for mounting two thyristors in series in each of four parallel paths. A plurality of such assemblies may be mounted on boards of panel structures and electrically interconnected to form a converter valve like that discussed above. In FIG. 4 there is shown a panel board 21 which is adapted to be disposed along with like panel boards in a housing arranged in accordance with my invention. Mounted upon panel board 21 are a pair of heat-dissipating-rectifier holding assemblies 22. Although these assemblies can take other suitable forms, they are particularly shown as being the same as that shown in FIG. 4 of the first mentioned co-pending application. Each assembly includes plural heat dissipating electrodes 23 which electrically contact respective terminals of the rectifiers 20 to apply pressure to them and to extract the heat which they generate in operation. To the latter end a plurality of narrow cooling fluid ducts 24 are provided in the electrodes 23. These ducts are formed by a plurality of heat dissipating fins 25 and are disposed immediately adjacent the rectifiers. The ducts are narrow so that upon the passage of a high velocity cooling fluid therethrough, turbulence results which effectuates efficient heat extraction.

Each of the assemblies 22 are directly mounted on panel boards 21 so that the cooling ducts 24 in electrodes 23 communicate with apertures 26 in the panel boards. These apertures can be seen in FIG. 5. Panel board 21 also serves to mount voltage control and gate pulse forming circuitry 27 for the rectifiers and a saturable core reactor 28 connected in series with the rectifiers as well as protective circuitry (not shown) for the rectifiers. More information about the details and operation of some of these circuits can be found in U.S. Pat. No. 3,424,664 (Dewey). Panel board 21 is made of an electrical insulating material to prevent the rectifiers from being short-circuited since electrodes 23 are mounted directly to the panel board. Suitable means (not shown) are provided for interconnecting the assemblies on the panel boards so that the rectifier arrays are connected in series between terminals (not shown) at opposite ends of each panel board. FIG. 5 is a front view, partially broken away, of a valve housing 29 arranged in accordance with my invention. Housing 29 comprises a pair of insulative sidewalls (only one of which, 30, can be seen) a pair of insulative ends walls 32 and 33, and insulative top wall 34, and an insulative bottom wall 34a. Disposed inside the housing are a plurality of panel boards 21 like that shown in FIG. 4. Each panel board is adapted for easy removal from the housing. Toward that end the housing may include openings in the sidewalls through which the panels may be passed for insertion in or removal from the housing. To expedite their insertion or removal, the panels may be adapted for sliding on tracks provided in the housing normal to the sidewalls. Cover plates may be provided for closing the sidewall openings.

Figures 5, 6:
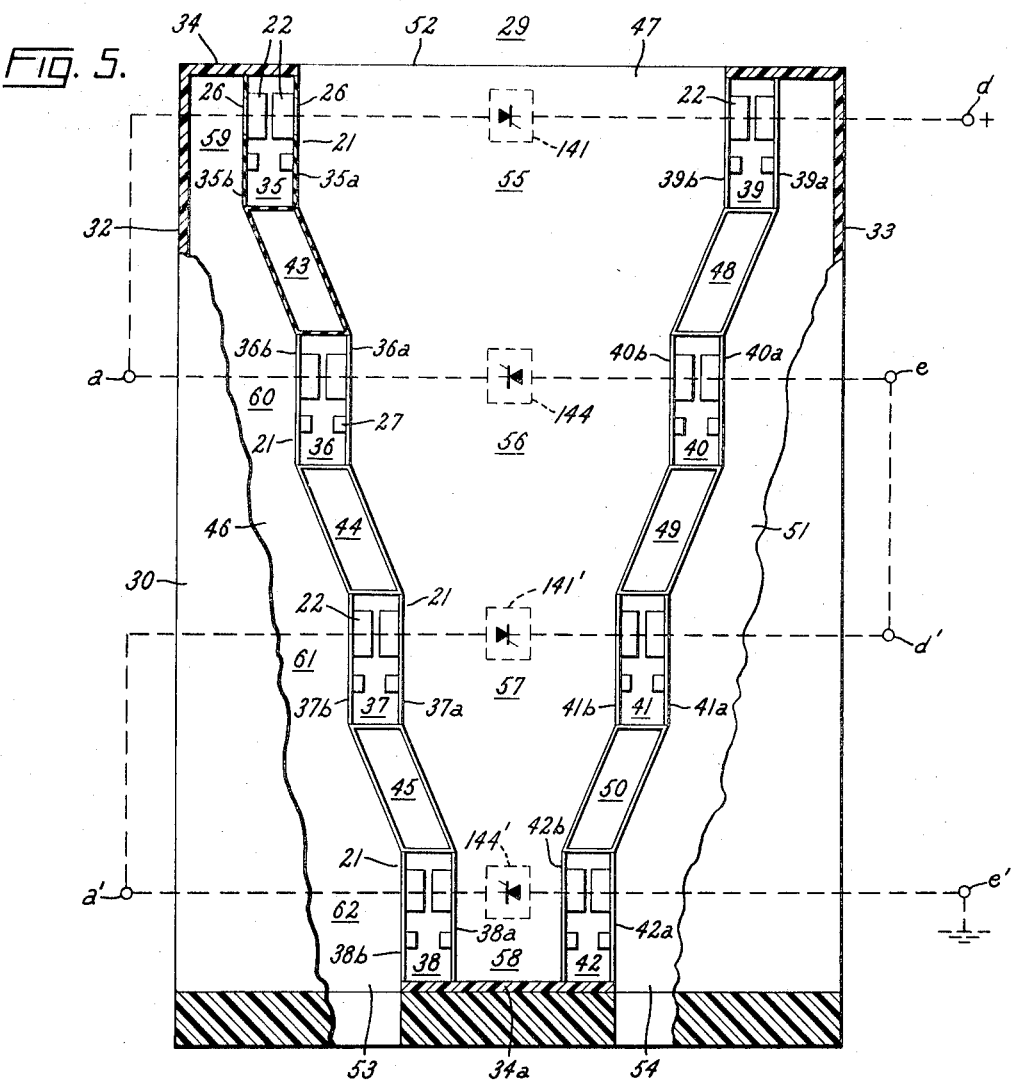
FIG. 5 is a front view, partially in section, of a housing for selected valves of the converter with a schematic diagram of those valves, in phantom lines, superimposed thereon to depict the physical arrangement of the valves therein.
FIG. 6 is a perspective view of a portion of the housing shown in FIG. 5.

As can be seen from FIG. 5 the panel boards are disposed in pairs which are parallel to and closely spaced apart from each other so that their apertures 26 are aligned. Each pair forms a separate panel structure. Pair 35$a$ and 35$b$ form structure 35. Pair 36$a$ and 36$b$ form structure 36. Pair 37$a$ and 37$b$ form structure 37. Pair 38$a$ and 38$b$ form structure 38. Pair 39$a$ and 39$b$ form structure 39. Pair 40$a$ and 40$b$ form structure 40.

Pair 41a and 41b form structure 41. Pair 42a and 42b form structure 42. Although the panel structures are shown as including two panel boards 21, panel structures including more or less than two panel boards can also be utilized.

As can be seen from FIG. 5, an insulating member 43 is connected between panel structures 35 and 36, an insulating member 44 is connected between panel structures 36 and 37, and an insulating member 45 is connected between panel structures 37 and 38. Panel structures 35, 36, 37, and 38 and members 43, 44 and 45, as a group, form a wall of a pair of ducts 46 and 47. An insulating member 48 is connected between panel structures 39 and 40, an insulating member 49 is connected between panel structures 40 and 41 and an insulating member 50 is connected between panel structures 41 and 42. Panel structures 39, 40, 41 and 42 and members 48, 49 and 50, as a group, form another wall of duct 47 and a wall of another duct 51.

The function of duct 47, hereinafter called the inlet duct, is to carry a cooling fluid to the panel structures in the housing so that it can extract the rectifier-generated heat from the panel-mounted-assemblies. The function of ducts 46 and 51, hereinafter called the outlet ducts, is to provide a passage through which the fluid can pass after having extracted the rectifier generated heat.

The top wall 34 of housing 29 includes an aperture 52 which communicates with duct 47. This aperture is provided to permit the ingress of the cooling fluid into the inlet duct and is denoted as an entrance aperture. The bottom wall 34a of the housing includes two apertures 53 and 54. Aperture 53 communicates with duct 46 and aperture 64 communicates with duct 51. These apertures are provided to permit the fluid to exit the housing and are denoted as exit apertures.

The path of fluid flow through the housing is as follows: the fluid enters housing 29 through entrance aperture 52 into inlet ducts 47. It flows through this duct to the panel structures forming the walls thereof and from there it passes through panel apertures 26 and enters the narrow cooling ducts 24 of the panel mounted assemblies 22. In its passage through these ducts it extracts the rectifier-generated heat so that its temperature is necessarily increased. Upon exiting ducts 24 the elevated temperature fluid passes through respective outlet ducts 46 and 51 and corresponding exit apertures 53 and 54 to exit the housing. decrease Preferably, as is shown in FIG. 5, the parallel panel structures are laterally offset from one another so that the inlet ducts decrease in cross sectional area in the direction of the fluid flow while the outlet ducts increase in cross sectional area in that direction. For example, panel structure 36 is parallel to and laterally offset from panel structure 35, panel structure 37 is parallel to and laterally offset from panel structure 36 and panel structure 38 is parallel to and laterally offset from panel structure 37. Similarly, panel structure 40 is parallel to and laterally offset from panel structure 39, panel structure 41 is parallel to and laterally offset from panel structure 40 and panel structure 42 is parallel to and laterally offset from panel structure 41. When arranged in this manner the cross sectional area of the portion 55 of inlet duct 47 located between panel structures 35 and 39 is larger than the cross sectional area of the duct portion 56 located between panel structures 36 and 40, which in turn is larger than the cross sectional area of the duct portion 57 located between panel structures 37 and 41, which in turn is larger than the cross sectional area of the duct portion 58 located between panel structures 38 and 42. Further, the cross sectional area of the portion 59 of outlet duct 46 located between side wall 32 and panel structure 35 is smaller than the cross sectional area of duct portion 60 located between the sidewall and panel structure 36 which in turn is smaller than the cross sectional area of duct portion 61 located between the sidewall and panel structure 37, which in turn is smaller than the cross sectional area of the duct portion 62 locate between the sidewall and panel structure 38.

If the pressure drop along each path that the cooling fluid takes through the housing is approximately equal, the amount of fluid flowing in each path will also be approximately equal and each rectifier will receive a substantially equal share of the cooling fluid. Assemblies 22 are constructed to such close tolerances that the pressure drop through the ducts 24 in any one of them at any given fluid flow will be the same as the pressure drop through the ducts of another. The cross sectional area of respective inlet and outlet duct portions are configured in accordance with the teachings in copending application 48AV00306 so that pressure drop in each duct portion is approximately equal. Therefore, the total pressure drop along each path is approximately equal, and efficient cooling of all the rectifiers is obtained.

The insulating base and walls and the various internal supporting members and barriers of the valve housing 29 are properly selected and dimensioned to provide adequate electrical insulation between the many rectifier-holding-assemblies and interconnecting conductors which are disposed therein. In accordance with my invention, as shown in FIG. 5, the space required for the requisite insulation is most efficiently utilized, and the net space which must be provided in the valve hall is consequently minimized, by locating in a single housing 29 all of the panel-mounted assemblies forming two valve-pairs which are respectively associated with adjoining bridge circuits of the converter. Three of these housings are therefore required for the illustrated 12-pulse converter. The housing is arranged with the valve pair (141, 144) of the bridge circuit 14 which is at a higher electrical potential relative to ground disposed above the valve pair (141', 144') of the lower potential bridge 15. In arranging each of the three housings in this manner, I utilize the space occupied by the lower-potential valve-pair to insulate the rectifier-holding-assemblies and conductors forming the higher-potential valve-pair from the closest ground plane which is the ground upon which the housing is disposed. The space separating the individual housings is utilized to insulate the A-C terminals of each bridge from one another, thereby ensuring sufficient insulation against the relatively large phase-to-phase voltages which exist between these terminals in a high-voltage converter.

The serial connection of any valve pair of one bridge circuit and any valve pair from another lower voltage bridge circuit forms what can be denominated as a "quadri-valve." As shown in FIG. 5 a "quadri-valve" made up of valve-pairs 141, 144 and 141', 144' is disposed in housing 29. Another housing 29' may be used for enclosing and supporting a "quadri-valve" made up of valve-pairs 143, 146 and 143', 146' and a third housing 29'' may be used for a "quadri-valve" made up of valve-pairs 145, 142 and 145', 142'. A converter construction using such an arrangement fulfills the design objective of minimizing the amount of space which must be provided in the valve hall for a converter of a given rating.

As is indicated by the phantom lines in FIG. 5, the rectifiers in the assemblies mounted on panel structures 35 and 39 of the housing 29 form valve 141, the rectifiers in the assemblies mounted on panel structures 36 and 40 form valve 144, the rectifiers in the assemblies mounted on panel structures 37 and 41 form valve 141' and the rectifiers in the assemblies mounted on panel structures 38 and 42 form valve 144'. The physical disposition of the electrical connectors used to interconnect the panel structures in accordance with the phantom schematic of FIG. 5 can be seen in FIG. 6.

FIG. 6 shows, in perspective, the upper half of housing 29 and the buswork which electrically interconnects the panel structures therein contained. As can be seen, a conductor or bus bar 63 is provided outside the front wall 30 of the housing 29. This bus bar provides the D-C terminal $d$ for the "quadri-valve" shown. A bus bar 64 is provided outside the back wall of the housing to interconnect panel boards 39a and 39b. A bus bar 65 disposed outside of the front wall to interconnect panel 39b and 35a, a bus bar 66 is provided outside the backwall to interconnect panel 35a and 35b, and a bus bar 67 is provided outside the frontwall to provide the phase A connection (A-C terminal $a$ of bridge 14) and to connect panel 35a and panel 36b. A bus bar 68 is provided outside the backwall to interconnect panels 36b and 36a, a bus bar 69 is provided outside the frontwall to interconnect panel 36a with panel 40b, a bus bar 70 is provided outside the backwall to interconnect panel 40b and 40a, and a bus bar 71 is provided outside the frontwall to provide the common D-C connection (terminals $e$ and $d'$) between bridges 14 and 15 and to connect panel 40a to panel 41a. Similar bus bars (not shown) are used to interconnect the remaining panels forming the "quadri-valve."

Of the two bridges forming the pole of the converter shown, bridge 14 is at a higher potential relative to ground than bridge 15. Accordingly, more insulation must be provided between valve pair 141, 144 and ground than between valve-pair 141', 144' and ground. The insulation for the latter valve pair may consist of a block of insulating material 72 upon which the housing 29 is disposed. The height of block 72 is a function of the phase A' line-to-ground voltage. The insulation between the former valve pair and the ground is supplied by the space in which valve pair 141', 144' is disposed. Thus the space in which valve pair 141', 144' is located not only serves to house that valve pair but also serves to provide the necessary insulation between valve pair 141, 144 and ground.

Insofar as the voltage between the A-C terminals of any of the converters' bridge circuits is concerned, the housings 29, 29' and 29'' are disposed sufficiently far apart so that the space therebetween serves as the necessary line insulation. Insulation for the line-to-line voltage between the two A-C terminals associated with the valve-pairs making up the "quadri-valve" (e.g., terminals $a$ and $a'$) is provided by making the dimensions of each housing such that phase conductors associated with those phases are spaced sufficiently apart from each other to preclude arcing. Normally the height of housing which is necessary to provide sufficient insulation between the D.C. terminal $d$ and ground will provide sufficient insulation to support the line-to-line voltage of the two A-C terminals of the "quadri-valve."

It should be noted at this point that while I have shown one "quadri-valve" as including valve pairs 141, 144 and 141', 144', it should be apparent that either valve pair 143', 146' or 145', 142' can be used in lieu of valve pair 141', 144' to form the "quadri-valve." The valve pair arrangement shown however is preferable in that it maintains proper phase rotation and simplifies connections between the rectifier holding assemblies forming the two valve-pairs which are enclosed in the same housing.

It should also be noted that if the converter consists of more than two bridge circuits then more than two valve pairs can be disposed within each housing. For example, if the converter has four bridges (for 24 pulse operation) a valve pair from each of the four bridges could be disposed in a single housing with the valve pair at the highest electrical potential disposed above the valve pair at the next highest potential and so on.

FIG. 6 shows a building or valve hall 73 in which the "quadri-valve" housings 29, 29', and 29'' may be disposed. The cooling system shown therein is of the two plenum, closed-loop, forced air type. As can be seen, building 73 includes a grounded floor or base 74, upon which housings 29, 29' and 29'' are disposed. Each housing is insulated from ground by insulating block 72. The air space 75 above the building floor acts as one plenum while the enclosed spaces 76 below the floor act as second plenums. The first plenum communicates with the inlet ducts inside the housings via their entrance apertures. The second plenums communicate with the outlet ducts inside the housings via their exit apertures.

A plurality of fans 77 are associated with each plenum 76 (although only one of which can be seen) and are disposed below the floor 74. These fans communicate with their associated plenums 76 to draw the air from the upper plenum 75 through the respective housing ducts and the heat dissipating assemblies into the lower plenums 76. From these lower plenums the air, which was heated in extracting heat from the rectifiers, is forced through an air-to-glycol heat exchangers 78 whereupon the temperature of the air is reduced to a predetermined temperature (depending upon the amount of rectifier-heat to be extracted). The cooled air is then returned to the upper plenum via apertures 79 in floor 74. It should be noted that in lieu of separate plenums 76 associated with each of the quadri-valve housings a common lower plenum may be utilized. A plurality of fans and heat exchangers may be utilized in conjunction with the common lower plenum of such an arrangement.

The upper plenum, being the interior of building 73, is large enough to be considered as an infinite air source. Thus air turbulence is minimal at the housing entrance apertures so that each housing inlet duct receives the same amount of air as any other inlet duct.

Similarly, the lower plenums 76 are made large enough so that air turbulence therein is minimized whereupon each fan can act upon an equal amount of air with no one fan working harder or easier than others.

While I have shown my "quadri-valves" in a converter utilizing two serially connected AC/DC bridges per pole, it should be apparent that my housing arrangement can be used for any converter utilizing plural AC/DC bridges connected between a D-C terminal and ground.

Accordingly, while I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In a high voltage electric power converter including a plurality of high current electric valves interconnected to form first and second bridge circuits, said first bridge circuit being at a higher electrical potential relative to ground than said second bridge circuit, each of said bridge circuits comprising at least two valve-pairs, the improvement comprising: a first electrically insulative housing disposed upon a grounded base, said first housing enclosing a first one of the valve-pairs of said first bridge circuit and a first one of the valve-pairs of said second bridge circuit, said valve-pairs being arranged therein with the latter valve-pair physically interposed between the former valve-pair and the grounded base, and a second electrically insulative housing spaced apart from said first housing and disposed upon said base, said second housing enclosing a second one of the valve-pairs of said first bridge circuit and a second one of the valve-pairs of said second bridge circuit, said valve-pairs being arranged with the latter valve-pair physically interposed between the former valve-pair and the grounded base, whereby the higher potential valve-pairs in each of the housings are insulated from the grounded base by the housing space occupied by the lower potential valve-pair.

2. The converter as specified in claim 1 wherein electrically insulative members are provided upon which said housings are disposed to insulate said housings from said grounded base.

3. The converter as specified in claim 1 wherein each of said valves comprises a plurality of electrically interconnected semiconductor rectifier devices.

4. In a high voltage electrical converter apparatus including a plurality of high current rectifier valves connected to form first and second three-phase double-way bridge circuits each having first, second and third valve-pairs whose respective A-C terminals are adapted to be connected to the different phases of a three-phase alternating voltage system, said first bridge circuit being at a higher electrical potential relative to ground than said second bridge circuit, the improvement comprising: a first electrically insulating housing, disposed upon a grounded base and enclosing a first valve-pairs of the respective first and second bridge circuits, with the first valve-pair of second bridge circuit being physically interposed between the first valve-pair of the first bridge circuit and said grounded base; a second housing, disposed upon said grounded base and spaced sufficiently from said first housing to provide insulation for the higher phase-to-phase voltage between said A-C terminals, said second housing enclosing the second valve-pairs of the respective first and second bridge circuits with a second valve-pair of the second bridge circuit being physically interposed between the second valve-pair of the first bridge circuit and said grounded base; and a third housing, disposed upon said grounded base and spaced sufficiently from said first and second housings to provide insulation for the highest phase-to-phase voltage between said A-C terminals, said third housing enclosing the third valve-pairs of the respective first and second bridge circuits with the third valve-pair of the second bridge circuit being physically interposed between the third valve-pair of the first bridge circuit.

5. The converter apparatus as specified in claim 4 wherein said valves comprise a plurality of interconnected semiconductor rectifier devices.

* * * * *